May 13, 1924.

H. N. PARSONS

BALL RETAINER

Filed Jan. 21, 1922      3 Sheets-Sheet 1

Inventor
Harry N. Parsons,
By Dyrenforth, Lee, Chritton & Wiles,
Attys.

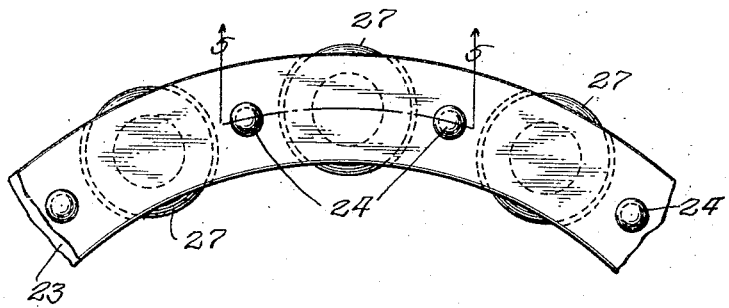
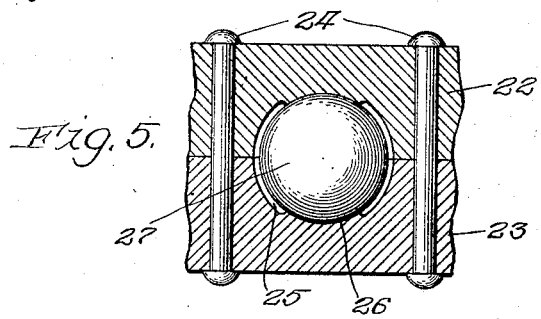
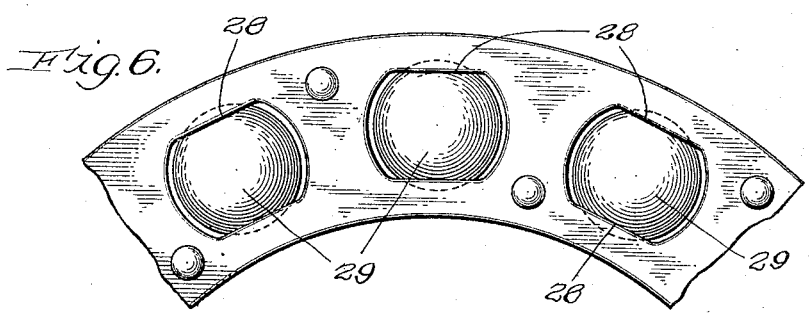
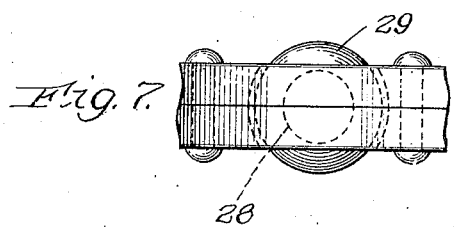

May 13, 1924.   1,494,012
H. N. PARSONS
BALL RETAINER
Filed Jan. 21, 1922   3 Sheets-Sheet 3
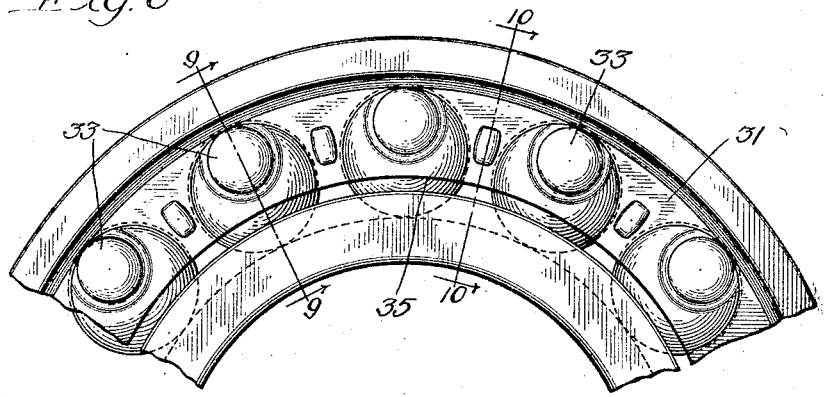
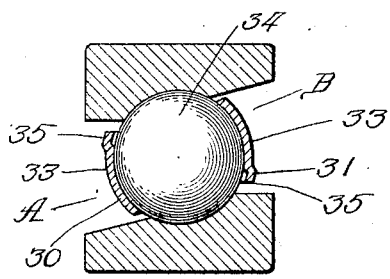
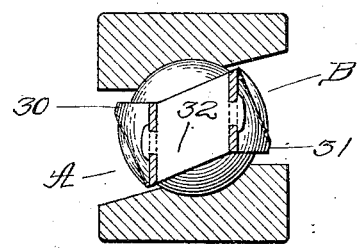
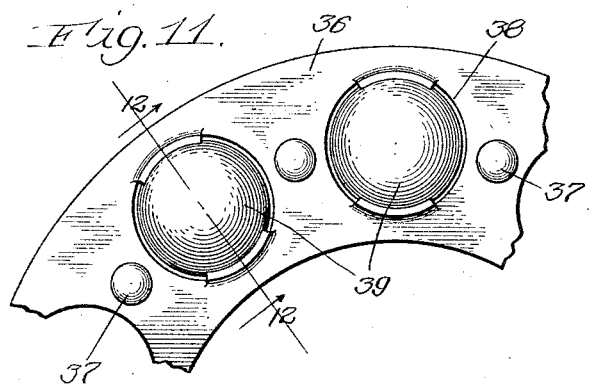
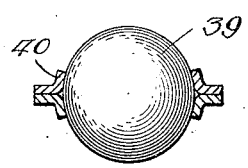
Inventor,
Harry N. Parsons,
By Dynenforth, Lee, Chritton & Wiles,
Attys.

Patented May 13, 1924.

1,494,012

UNITED STATES PATENT OFFICE.

HARRY N. PARSONS, OF CHICAGO, ILLINOIS, ASSIGNOR TO U. S. BALL BEARING MANUFACTURING COMPANY, OF CHICAGO, ILLINOIS, A CORPORATION OF ILLINOIS.

BALL RETAINER.

Application filed January 21, 1922. Serial No. 530,819.

*To all whom it may concern:*

Be it known that I, HARRY N. PARSONS, a citizen of the United States, residing at Chicago, in the county of Cook and State of Illinois, have invented a new and useful Improvement in Ball Retainers, of which the following is a specification.

This invention relates to ball retainers for ball bearings and is fully described in the following specification and shown in the accompanying drawings, in which—

Fig. 4 is a partial front elevation of another modified form of retainer;

Fig. 5 is a partial section on the line 5 of Fig. 4;

Fig. 6 is a partial front elevation all from another modification;

Fig. 7 is a partial side elevation of the same;

Fig. 8 is a partial front elevation of a combined radial and thrust bearing, showing another modified form of the invention;

Figs. 9 and 10 are sections on the lines 9 and 10, respectively, of Fig. 8;

Fig. 11 is a partial front elevation of still another modified form of my invention, and Fig. 12 is a section on the line 12—12 of Fig. 11.

Figure 1:
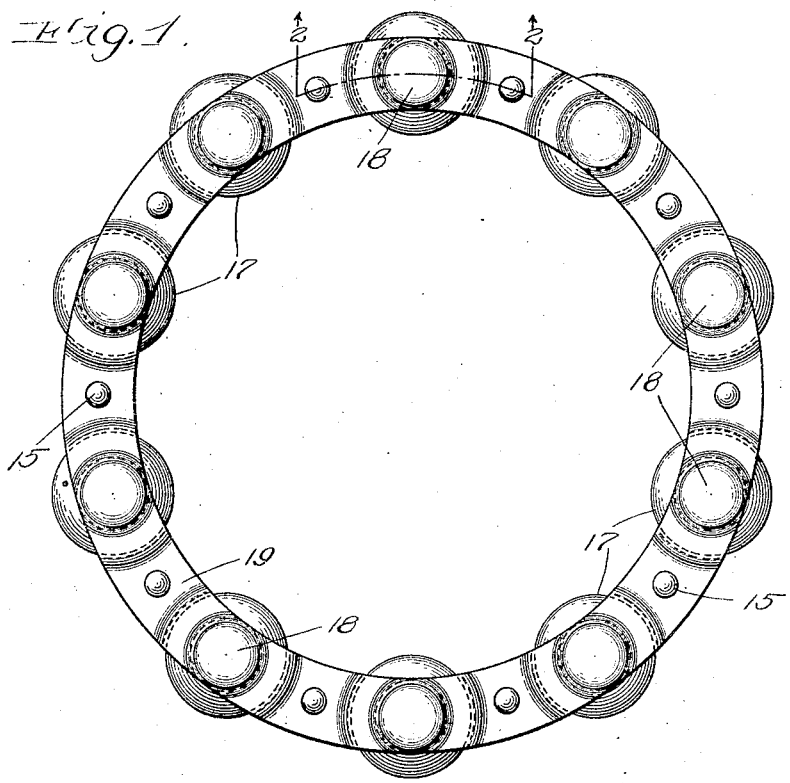
Figure 1 is a front elevation of a ball retainer embodying my invention.
Figure 2:
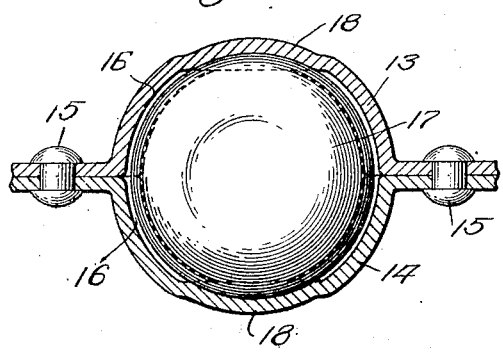
Fig. 2 is an enlarged partial section on the line 2—2 of Fig. 1.

The retainer shown in Figs. 1 and 2 is made up of two similar members 13 and 14, secured together by means of rivets 15. These members have registering hemispherical openings 16, which are considerably larger than the balls 17 which they surround. The bottoms of the openings 16, through which pass the axes of rotation of the balls, are pressed inwardly at 18, so as to form bearings for the balls at their axes. A retainer is thus provided whereof friction of the retainer on the balls is reduced to a minimum since the fast moving surface of the balls does not come in contact with the retainer.

Figure 3:
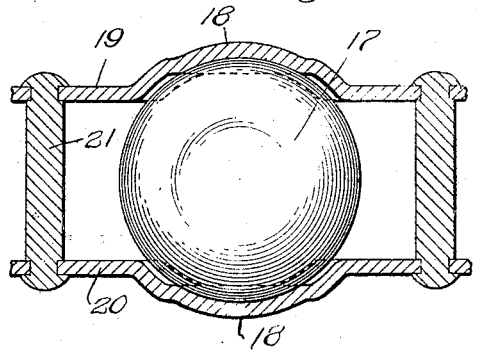
Fig. 3 is an enlarged partial section showing a modified form of retainer.

Fig. 3 shows a modification in which the retainer members 19 and 20 are held in separated position by shouldered rivets 21. Otherwise the construction of the retainer shown in Fig. 3 is similar to that shown in Fig. 2.

Figs. 4 and 5 show a modification similar to that shown in Fig. 3, but one in which the retainer ring is made of members formed from flat angular rings 22 and 23, secured together by means of rivets 24 and having openings 25 cast or melted therein. The bottoms 26 of these openings accurately fit the balls 27 on their axes of rotation.

Figs. 6 and 7 show this form of retainer as applied to thrust ball bearings, whereas the forms heretofore described are applicable to radial bearings. Here also the portions 28 fit the balls 29 only at their axes of rotation, the openings 29 being large enough that the ball does not touch the retainer at other points.

The bearing shown in Figs. 8, 9 and 10 is of a combined radial and thrust type, the axis of rotation in this case being on the line A—B, as shown in Figs. 9 and 10. The retainer is shown as made up of two members 30 and 31, which are secured together by means of shouldered rivets 32. Cap-like portions 33 are formed in these members and accurately fit the balls 34 on their axes of rotation. The hemispherical portions 35 lie adjacent the cap-like portions 33 and stand some distance from the ball, so that it would not normally be engaged thereby. In all cases, however, should friction be sufficient to wear the ball 34 engaging the cap-like portion 33, it will still be retained by the enlarged hemispherical portion 35.

Figs. 11 and 12 show still another modified form of the invention as applied to a thrust bearing. The retainer in this case consists of two members 36, secured together by means of rivets 37 and having openings 38 larger than the balls 39, which are to be retained therein. The edges of the openings 38 are turned up to form ears 40, which engage the sides of the balls upon their approximate axes of rotation.

While I have shown and described certain embodiments of my invention, it is to be understood that it is capable of many modifications. Changes, therefore, in the construction and arrangement may be made without departing from the spirit and scope of the invention as disclosed in the appended claim, in which it is my intention to claim all novelty inherent in my invention as broadly as possible in view of the prior art.

What I claim as new and desire to secure by Letters Patent, is:

A ball retainer for ball bearings comprising two members formed of sheet metal riveted together, each having registering depressions to receive said balls, a circular portion of each of said depressions lying at the axis of said ball closely fitting said ball, the depression surrounding said circular portion being concentric with said ball and larger than said ball and means for securing said members together on said balls.

HARRY N. PARSONS.